UNITED STATES PATENT OFFICE.

JAMES G. VAIL, OF CHESTER, AND JOHN D. CARTER, OF LANSDOWNE, PENNSYLVANIA.

SOLUTION OF ALKALINE SILICATES AND PROCESS OF PREPARING THE SAME.

1,129,320. Specification of Letters Patent. Patented Feb. 23, 1915.

No Drawing. Application filed October 22, 1913. Serial No. 796,559.

*To all whom it may concern:*

Be it known that we, JAMES G. VAIL and JOHN D. CARTER, citizens of the United States, and residents of the city of Chester, county of Delaware, and State of Pennsylvania, and of Lansdowne, county of Delaware, and State of Pennsylvania, respectively, (whose post-office addresses are: in care of the Philadelphia Quartz Company, Chester, Pennsylvania,) have invented certain new and useful Solutions of Alkaline Silicates and Processes of Preparing the Same, of which the following is a specification.

While it has been recognized that solutions of alkaline silicates, such as sodium silicate, are well adapted for use as a medium or vehicle for fire-resisting, and other paints or varnishes, as well as for other purposes, it has hitherto been impossible to produce such a solution, which, when dry, would alone form a coating sufficiently insoluble for commercial purposes. It has therefore been necessary to combine the silicate solution with various active substances of such nature that the resulting reaction would form a product, which, when dry, would form an insoluble, or practically insoluble, coating.

Among the principal objects of our invention are to produce a solution of an alkaline silicate, which, when dry, shall be practically insoluble; to produce such a solution, which may be used by itself as a transparent varnish or coating, or which may be used as a medium or vehicle for mixture with other substances of any desired nature to form a paint or varnish, and which, when so used, either alone or in combination with other substances, shall produce a coating which will be practically unaffected by atmospheric or climatic conditions; and to produce such a solution which may be evaporated to a viscous condition alone, or made into a pasty condition in combination with other substances, and thereafter diluted by the addition of water or other liquids to any desired extent.

Further objects of our invention are to produce a solution of an alkaline silicate which may be kept indefinitely in closed receptacles, either alone, or in combination with other substances, but which, when dried by exposure to the air or otherwise, shall form a practically insoluble, fire and weather resisting product which may be employed whenever it be desired to produce an insoluble, transparent coating upon any surface, and which may be combined with either active or inert pigments to form a paint, or with various gums or other substances, such as dextrin, to form varnishes and like coatings, having similar fire and weather resisting properties. The product may also be used either alone, or in combination with other materials, to form glues, cements, and other similar articles, in which case its consistency and method of employment may be suitably adapted to meet the varying conditions of its use.

Our invention further includes all of the various other novel features and objects hereinafter more definitely specified.

We have found that if silicic acid before it has assumed its gelatinous character, be suitably combined with an excess of a solution of an alkaline silicate, such as sodium silicate, the resulting product will be a solution of alkaline reaction, which, when dry, forms a substantially insoluble compound, without the addition of other ingredients. In the practice of our invention, we have found that good results may be obtained by the dilution of a given quantity of a solution of an alkaline silicate, such as sodium silicate, with substantially ten times its weight of water, the dilute solution thus obtained being then neutralized or slightly acidified with a suitable acid, after which a quantity of the original alkaline solution substantially equal in amount to the dilute solution, may be added. The resulting liquid is an alkaline solution of the silicate, which has the property of forming an insoluble, or practically insoluble, product after being dried by evaporation or otherwise. It is believed that many of the valuable properties of the liquid so produced may be attributed to the action of the silicic acid, liberated in the dilute solution, in the presence of the excess of the suitably concentrated alkaline solution, and it may therefore be possible to produce a substance having similar properties by otherwise bringing silicic acid into contact with an excess of a suitably concentrated solution of an alkaline silicate, as for instance, by adding a dilute solution of a suitable acid to an excess of a suitably concentrated alkaline silicate. For the purpose of producing paints or varnishes, various pigments or other substances may be mixed with this product as desired, but since the product alone is capable of forming, when dry, a practically insoluble transparent and fireproof coating upon any surface upon which it may be spread, numerous inert substances may be utilized for this purpose, the employment of which has hitherto been prevented owing to the necessity of using an active substance which would combine with the constitutents of the silicate solution to form a substantially insoluble coating. Use, therefore, may be made of numerous inert pigments, the product presenting a satisfactory medium or vehicle for the use of such substances, being adapted, as it is, to form, after drying, a difficultly soluble coating independent of the action of substances which may be combined with it.

If desired, the product as hereinbefore described, may be evaporated, or otherwise reduced to a viscous condition, or may be made into a pasty condition by combination with suitable substances, and as thus prepared, may readily and economically be transported and kept until it be desired to make use thereof, at which time, the mass may be diluted to a proper consistency by the addition of water or other liquid.

It has been found that if the product, after being spread upon a given surface, and allowed to dry, be immersed or otherwise washed in water for a sufficient period, its strongly alkaline reaction will gradually disappear, until at last it cannot be detected even by careful tests, the product appearing to have become absolutely neutral. This peculiarity in no way, however, impairs or affects its valuable commercial features, or detracts from its durability or fire-resisting properties.

We do not desire to confine ourselves to the production of a solution of an alkaline silicate having the properties of our discovery solely by means of the process hereinbefore described, although we have found that process to be well adapted for the commercial production of the article. Furthermore, when such process is employed, it will be evident that various changes may be made in the proportions of the ingredients or in the degrees of concentration thereof, or in the condition under which it may be carried out, in order to adapt the process to the most economical and satisfactory preparation of the product for commercial use, and that the resulting product as heretofore set forth may be mixed with various substances to form paints or varnishes or the like, or used for other purposes such as cement, as may be desired, and that other changes and modifications may be made without departing from the spirit and scope of our invention as defined in the appended claims.

Having thus described our invention, we claim and desire to protect by Letters Patent of the United States:

1. A solution of an alkaline silicate forming a substantially insoluble product when dry.

2. A solution of sodium silicate forming when dry a difficultly soluble product.

3. An alkaline solution composed of a neutralized solution of a silicate to which has been added a concentrated alkaline solution of a silicate.

4. An alkaline solution composed of a neutralized solution of sodium silicate to which has been added a predetermined quantity of a concentrated alkaline solution of sodium silicate.

5. An alkaline solution having the property of forming a substantially insoluble product when dry, prepared by the formation of silicic acid in the presence of an excess of an alkaline silicate.

6. An alkaline solution prepared by the combination of an acid capable of decomposing sodium silicate and a solution of an alkaline silicate of a dilution sufficient to prevent the instantaneous precipitation of the liberated silicic acid, said solution having the property of forming a substantially insoluble product when dry.

7. An alkaline solution composed of a dilute solution of sodium silicate which has been neutralized with an acid, and a concentrated solution of sodium silicate.

8. An alkaline solution composed of a dilute solution of sodium silicate which has been slightly acidified, and an excess of a concentrated solution of sodium silicate.

9. An alkaline solution capable when dry of forming a difficultly soluble product, prepared by the mixture of a dilute neutralized solution of sodium silicate with a concentrated solution of sodium silicate.

10. The process of preparing a solution of an alkaline silicate, which consists in neutralizing a dilute solution of the silicate and then adding thereto a concentrated solution of the silicate.

11. The process of preparing a solution of an alkaline silicate which will form a practically insoluble product when dry, which consists in first neutralizing a dilute solution of the silicate with an acid and adding thereto a concentrated solution of the silicate.

12. The process of preparing a solution of an alkaline silicate which will form a substantially insoluble product when dry, which consists in first slightly acidifying a dilute solution of the silicate with a suitable acid, and then adding thereto a concentrated solution of the silicate.

13. The process of preparing a solution of sodium silicate which when dry will form a difficultly soluble product, which consists in first neutralizing a dilute solution of sodium silicate with a suitable acid and then adding thereto a concentrated solution of sodium silicate.

14. An insoluble coating for a surface comprising a solution of a silicate in combination with a pigment, said solution being operative when dry to form a substantially insoluble coating without the assistance of the pigment.

In witness whereof, we, JAMES G. VAIL and JOHN D. CARTER, have hereunto set our hands this 20th day of tenth month, A. D. 1913.

JAMES G. VAIL.
JNO. D. CARTER.

Witnesses:
HENRY W. JONES,
BESSIE TAYLOR.

Copies of this patent may be obtained for five cents each, by addressing the "Commissioner of Patents, Washington, D. C."